United States Patent Office 3,472,066
Patented Oct. 14, 1969

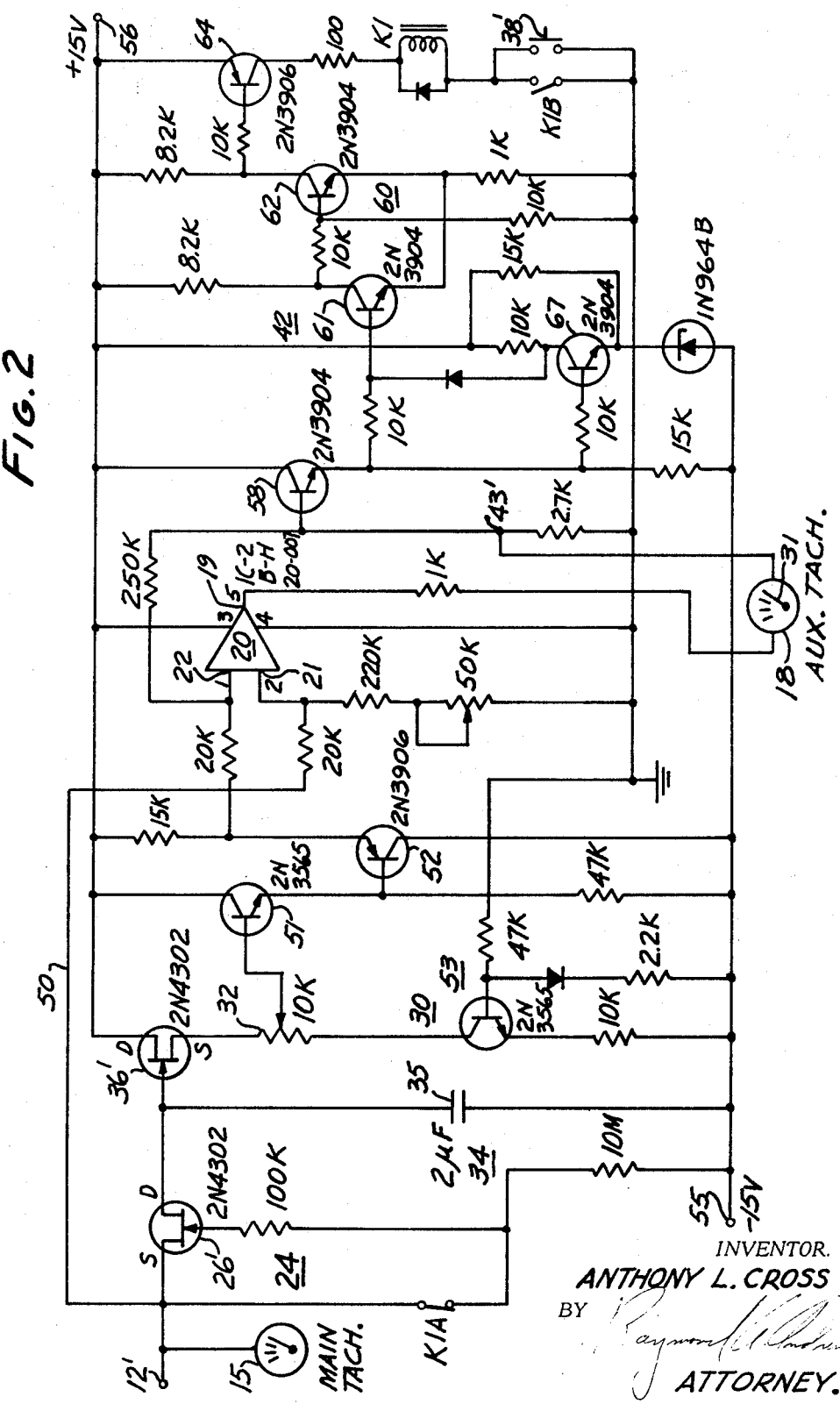

3,472,066
ENGINE TESTING APPARATUS
Anthony Leonard Cross, Pasadena, Calif., assignor, by mesne assignments, to Bell & Howell Company, Chicago, Ill., a corporation of Illinois
Filed Jan. 19, 1968, Ser. No. 699,212
Int. Cl. G01n 15/00; H03f 21/00
U.S. Cl. 73—116                 14 Claims

ABSTRACT OF THE DISCLOSURE

Apparatus for indicating variations in a performance parameter of an engine in response to the occurrence of an event affecting the operation of the engine, comprising means for providing a first signal varying in accordance with variations in the performance parameter, signal indicating means, and means for supplying in a first mode of operation a substantially constant second signal to the indicating means to maintain the indicating means in an initial indicating position irrespective of variations in the above mentioned first signal, and for providing in a second mode of operation a third signal for the indicating means by comparing variations in the above mentioned first signal to a substantially instantaneous value of the first signal at a time proximate to the occurrence of the above mentioned event.

BACKGROUND OF THE INVENTION

Field of the invention

The subject invention relates to measuring apparatus and, more particularly, to measuring apparatus useful in the testing of engines.

Description of the prior art

In the testing of internal combustion engines it is common to repress the ignition of one or more cylinders in order to obtain an indication about the contribution of such cylinder or cylinders to the total performance of the engine.

Examples of such testing apparatus and methods have, for instance, been described in U.S. Patents 2,809,344, Re. 23,150 and Re. 26,163. In recent years efforts have been undertaken to improve such methods and apparatus by providing measuring instruments which give a clear indication of the variations in engine performance which take place in response to the occurrence of ignition suppressions.

To this end, it has been proposed to employ tachometer instruments from which variations in engine speeds can be read. However, it is generally inconvenient to read speed variations from an instrument by noting a first reading prior to an ignition suppression and a second reading after the ignition suppression and to arrive at the speed differential by subtracting the latter from the former. In an effort to overcome this difficulty, the use of an auxiliary tachometer instrument has been proposed. Prior to an ignition suppression, the auxiliary instrument is adjusted to a zero position so that it will indicate speed differentials in absolute values during the ignition suppression test.

The main disadvantage of the latter method resides in the fact that the auxiliary instrument has to be readjusted prior to each phase of the test, since it is important that the zero setting of the auxiliary instrument correspond to the particular engine speed at the start of the test phase.

Summary of the invention

The subject invention overcomes the above mentioned drawback and resides in apparatus for indicating variations in a performance parameter of an engine in response to the occurrence of an event, such as an ignition suppression or carburetor adjustment, affecting the operation of the engine. The term "affecting" is used herein in the sense of producing an effect or change and is intended to be broad enough to cover both decreases and increases in engine performance.

According to the invention, the apparatus under consideration comprises means for providing a first signal varying in accordance with variations in the above mentioned performance parameter, as well as signal indicating means, and means for providing a second signal corresponding to an instantaneous value of the first signal at a time prior and proximate to the occurrence of the above mentioned event. The apparatus further includes means having a first mode of operation and being actuable to a second mode of operation upon an occurrence of the mentioned event, and being connected to the signal means for providing the first signal, to the means for providing the second signal, and to the signal indicating means for supplying in the first mode of operation a third signal to the indicating means, with such third signal being substantially constant irrespective of the variations of the first signal so that the indicating means are substantially maintained in an initial indicating position in response to the third signal, and for providing in the second mode of operation a fourth signal for the indicating means by comparing variations in the first signal during occurrence of said event with said second signal and for supplying the fourth signal to the indicating means so as to cause the indicating means to indicate variations in the performance parameter during the occurrence of the event.

The phrase "prior and proximate to the occurrence of the event" is intended to cover situations in which the instantaneous value of the first signal is determined immediately prior to the actuation of the above mentioned means from their first to their second mode of operation. The phrase just quoted is also intended to cover workable approximations to the latter instantaneous determination, as it may be found in practice that satisfactory indications are also obtained if the value of the first signal is determined somewhat prior to or somewhat after the latter actuation of the means just mentioned.

From a second aspect thereof, the invention also resides in apparatus for indicating variations in a performance parameter of an engine in response to the occurrence of an event affecting the operation of the engine, comprising means having a first input and a second input and providing an output signal by comparing a signal at the first input with a signal at the second input, and signal indicating means for indicating the output signal of the comparing means just mentioned.

This apparatus further includes means for providing a first signal varying in accordance with variations in the above mentioned performance parameter, means for providing a second signal corresponding to an instantaneous value of the first signal at a time prior and proximate to the occurrence of the above mentioned event, and means having a first mode of operation and being actuatable to a second mode of operation upon an occurrence of the above mentioned event, and being connected to the means for providing the first signal, to the means for providing the second signal, and to the signal comparing means for supplying in the first mode of operation the above mentioned first signal to the first input and to the second input of the above mentioned comparing means, to cause the indicating means to be maintained substantially in an initial indicating position irrespective of variations in the engine performance parameter, and for supplying in the second mode of operation the first signal to the first input and the second signal to the second input of the comparing means to cause the indicating means to indicate variations in the engine performance parameter during the occurrence of the above mentioned event.

As this description proceeds, it will be noted that the subject apparatus are ideally suited to indicate variations in all kinds of performance parameters of an engine in response to all kinds of adjustments or tests which affect the operation of the engine.

DESCRIPTION OF THE DRAWINGS

FIG. 2 is a circuit diagram of preferred electronic apparatus which may be employed in the system of FIG. 1.

DESCRIPTION OF PREFERRED EMBODIMENTS

Figure 1:
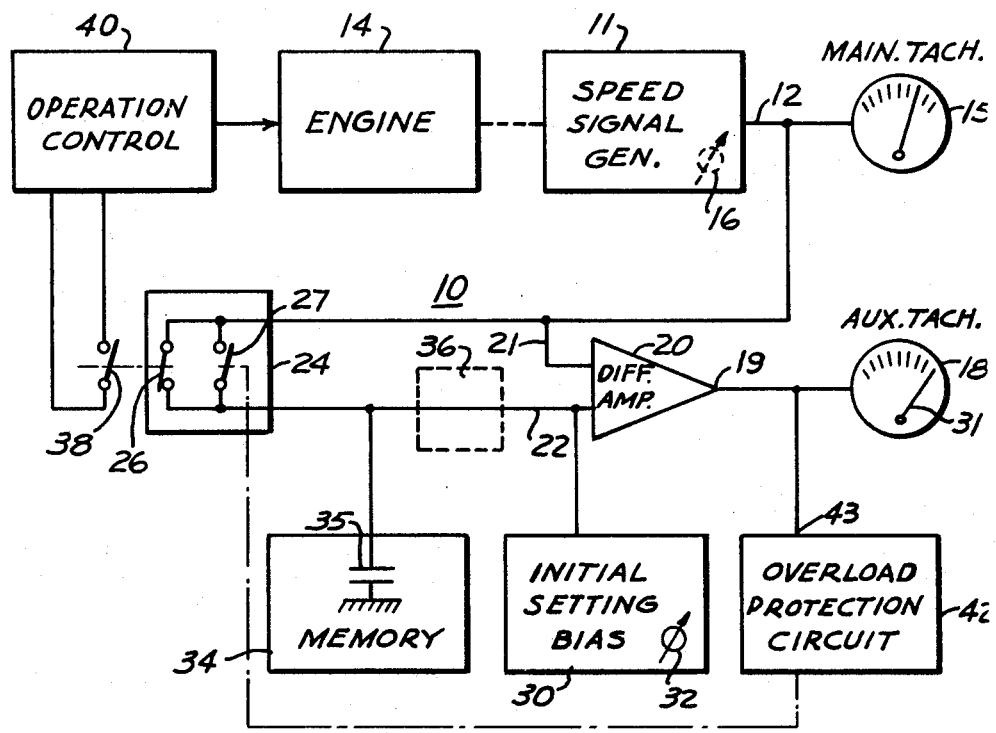
FIG. 1 is a block diagram of a testing and measuring system in accordance with a preferred embodiment of the subject invention.

The system of FIGS. 1 and 2 will be described in terms of engine speed and speed differential measurements, although it will be understood that other engine performance parameters may be measured as well.

The system 10 illustrated in FIG. 1 includes a conventional speed signal generator 11 which provides at an output 12 an electric signal which varies as a function of variations in the speed of the engine 14. Suitable type of speed signal generator are well known and include those which derive speed-indicative pulses from the breaker points of the engine ignition system and convert these pulses into a speed-indicative electric analog signal.

A main tachometer 15 is connected to the output 12 so as to indicate engine speed in response to the signal provided by the speed signal generator 11. As is well known in the art, the speed signal generator may have to be provided with a switch, shown at 16 in dotted lines, which serves to adjust the operation of the signal generator to certain features of the engine, notably to the number of cylinders of the engine being tested.

An auxiliary tachometer 18 is connected to the output 19 of a differential amplifier 20. This differential amplifier has a first input 21 which is connected to the output 12 of the speed signal generator 11 and a second input 22 which is connected to a switching circuit 24.

The switching circuit 24 preferably is of an electronic type, although it may be built with mechanical or electromechanical switches. In FIG. 1, the circuit 24 is shown as having a first switch 26 and a second switch 27 connected in parallel. The circuit 24 is illustrated in a first mode of operation in which the switch 26 is closed. In this first mode of operation, the circuit 24 connects the second input terminal 22 of the differential amplifier 20 to the output 12 of the speed signal generator 11. Accordingly, the same signal, namely the speed-indicative variable signal at the generator output 12 is applied to both differential amplifier inputs 21 and 22. In this manner, the signal at the differential amplifier output 19 is maintained constant irrespective of variations in the speed of the engine 14.

In the preferred embodiment shown in FIG. 1, a bias signal source 30 is connected to the input 22 of the differential amplifier 20. The source 30 provides a bias signal which appears at the output 19 of the differential amplifier and which biases the pointer 31 of the auxiliary tachometer 18 to a desired initial position. As indicated at 32, the bias signal provided by the source 30 is adjustable so that the pointer 31 may be set to any desired initial indicating position. For instance, if a test is to be conducted which foreseeably will result in a decrease of engine speed, the source 30 is preferably adjusted at 32 so that the pointer 31 is initially set to a position at or near the upper end of the measuring range of the auxiliary tachometer 18. If a test is to be conducted which will result in an increase in engine speed, the source 30 is adjusted so that the pointer is initially set at the position at or near the lower end of the auxiliary tachometer range. Similarly, if a test or engine adjustment is to be conducted which may result in either an increase or a decrease in the engine speed, the source 30 is adjusted at 32 so that the auxiliary tachometer pointer 31 occupies a center position preparatory to an indication of either positive or negative engine speed variations.

While the switch 26 of the circuit 24 is closed as shown, the output signal of the speed signal generator 11 is not only applied to the inputs 21 and 22 of the differential amplifier 20 as already mentioned, but is also supplied to a memory or storage circuit 34 which includes an element 35, such as a capacitor, which stores the signal derived from the speed signal generator 11. The function of the element 35 is such that the signal stored thereby will substantially correspond to the instantaneous value of the speed signal at the generator 12 at the moment the switch 26 is opened. A high impedance measuring circuit is shown in dotted lines at 36 to indicate a means for measuring the signal stored by the element 35 and applying a corresponding signal to the differential amplifier input 22, and for preventing the bias source 30 from charging the memory element 35. A preferred measuring circuit will be described in connection with FIG. 2.

The switch 26 is opened to actuate the circuit 24 from the above mentioned first mode of operation to a second mode of operation. If desired, the switch 26 may be ganged with a switch 38 which is closed when a testing phase of the engine 14 is to be initiated. According to FIG. 1, an operation control 40 is provided for changing an operation parameter of the engine 14 in response to a closing of the switch 38.

For instance, the control 40 may comprise apparatus for repressing the ignition of a selected cylinder of the engine 14 as shown in the prior patents cited above. Other controls for testing or adjusting the performance of internal combustion engines or other drive means are known to those skilled in the art. When the switch 38 is closed the control 40 becomes effective and the switch 26 in the circuit 24 is opened. This will not result in a deviation of the auxiliary tachometer pointer 31 from its initial position as long as the speed signal provided at the generator output 12 remains at the same value as the above mentioned instantaneous value stored in the memory circuit 34. To refer to the above mentioned example of ignition suppression, the speed of the engine 14 will generally not vary if the ignition of a cylinder is repressed that, due to a defect, does not contribute to the performance of the engine. However, if the ignition of a power-contributing cylinder is repressed, the speed of the engine will ordinarily drop. In consequence, the magnitude of the speed signal provided by the generator 11 will drop below the instantaneous value stored in the memory 34, and the signal at the input 21 will be different from the signal at the input 22 of the differential amplifier 20. The difference signal resulting at the amplifier output 19 is applied to the auxiliary tachometer 18 whereupon its pointer 31 will indicate the drop in speed by a deviation from the initial position of the pointer 31.

The indication provided by the auxiliary tachometer 18 in the manner just described provides a direct readout of the particular engine speed variation in response to the operational event imposed on the engine 14 by the control 40. The memory 34 preferably stores the above mentioned instantaneous value for a reasonable length of time so that further speed variations during the particular test phase may be detected on the auxiliary tachometer 18.

In addition to the features so far described, the system of FIG. 1 provides a reliable overload protection for the auxiliary tachometer 18. This overload protection includes an overload protection circuit 42 which actuates the above mentioned switch 27 in the switching circuit 24.

The protection circuit 42 has an input 43 connected to the differential amplifier output 19, and includes switching means for actuating the switch 27 to a closed position when the signal applied to input 43 assumes values outside the range of the measuring instrument. Overload protection circuits which actuate a switch in response to an excessive current or voltage are already known in the electrical art. To name an example, a simple overload protection device would include a bimetal element which closes the switch 27 when the current supplied to the auxiliary tachometer 18 exceeds a predetermined value.

The utility of the overload protection circuit 42 can be seen from the following example:

Assume that the switch 26 in the circuit 24 has been opened for the measurement of speed differentials in the above mentioned manner. Assume now that the speed of the engine 14 increases in an unexpected manner so that the value of the speed signal provided at the generator output 12 becomes much higher than the instantaneous signal value stored in the memory 34. In such a case the difference signal provided at the amplifier output 19 may reach values which could destroy the auxiliary tachometer 18. Such destruction is, however, prevented by the overload protection circuit 42 which closes the switch 27 so that the speed signal from the generator 11 is not only applied to the input 21, but also to the input 22 of the differential amplifier so as to cancel itself at the amplifier output 19. The auxiliary tachometer pointer 31 thereupon quickly returns to its initially set position, thereby indicating to the operator an unexpected development of the test. The operator can thereupon change the initial bias setting by actuating the control 32 of the bias source 30 so as to bring the increased speed within the range of the auxiliary tachometer 18. Due to the removal of the overload condition, the protection circuit 42 will reopen the switch 27 and the particular test phase may thereupon be repeated. The protection circuit 42 will then no longer interfere with the operation of the system until a further overload condition should occur.

FIG. 2 is a diagram of a practical apparatus which includes the circuits and circuit elements 20, 24, 30, 34, and 42 illustrated in FIG. 1.

The apparatus of FIG. 2 has an input terminal 12' which is connected to the output 12 of the speed signal generator 11. The previously discussed main tachometer 15 is connected to the input terminal 12' to indicate the speed of the engine 14 and variations in that engine speed. The indication of speed differentials during a test phase is initiated by a momentary actuation of a switch 38' which is shown at the right-hand side of FIG. 2 and which may be coupled to the test phase initiation switch 38 shown in FIG. 1.

Prior to the actuation of the switch 38' the speed signal occurring at the input terminal 12' is applied to the input 21 of the differential amplifier 20 by way of a lead 50 and is also applied to the input 22 of that amplifier by way of field effect transistors 26' and 36' and current amplifier stages 51 and 52, so as to produce no net output at the amplifier output terminal 19. The current amplifier stages 51 and 52 are designed to provide an output of sufficiently low source impedance for the amplifier input 22.

At the same time, the speed signal received at the input terminal 12' charges the memory capacitor 35, since the field effect transistor 26' is closed in the first mode of operation of the circuit.

Adjustment of the pointer 31 of the auxiliary tachometer 18 is provided for by a potentiometer 32 which has its fixed resistance connected between the field effect transistor 36' and a constant current source 53 as shown, and which has its sliding contact connected to the current amplifier stage 51 to supply the above mentioned adjustable bias to the differential amplifier input 22.

The second mode of operation of the apparatus illustrated in FIG. 2 is initiated by a momentary closing of the switch 38'.

When the switch 38' is closed, a relay K1 is energized and actuates a pair of contacts K1A and K1B. The contact K1B is in a self-holding circuit so that the relay K1 will remain energized when the switch 38', which is only momentarily actuated, is released. Actuation of the relay contact K1A causes a blocking of the transistor 26' which, in that sense, performs the function of the switch 26 shown in FIG. 1.

After such blocking, the speed signal from input terminal 12' is only applied to the amplifier input 21 (by way of lead 50), while the input 22 of the differential amplifier is then supplied with a signal corresponding to the voltage of the charge stored in the memory capacitor 35. Prior to blocking of transistor 26', the charge of the capacitor 35 follows the variations of the speed signal applied at 12'. At the instant the transistor 26' is blocked, charge variations at the capacitor 35 stop, so that the charge of this capacitor is proportional to the instantaneous value of the speed signal at the moment of the blocking of transistor 26'. This provides a voltage at the capacitor 35 which is proportional to the latter instantaneous speed signal value.

The field effect transistor 36' measures the latter voltage and, in cooperation with the stages 51 and 52, provides for the application of a corresponding signal to the input 22 of the differential amplifier 20. In this manner, the speed signal variations at the amplifier input terminal 21 are compared by the differential amplifier 20 to a signal corresponding to the aforesaid instantaneous speed signal value, and the auxiliary tachometer 18 is caused to indicate net variations of the engine speed signal. This, of course, provides a read-out of the effect of the operation control 40 shown in FIG. 1 on the speed of the engine 14. If the operation control is a carburetor adjustment, the auxiliary tachometer 18 indicates the net effect of such adjustment on the speed of the engine. If the operation control is a disablement of the ignition of a predetermined engine cylinder, the auxiliary tachometer 18 indicates the net effect of such disablement on the engine speed. If the cylinder is defective so as to contribute nothing to the engine performance, its disablement will, broadly speaking, have no net effect on the engine speed. A net effect is however present if the cylinder is in a power-contributing condition. The magnitude of the net effect generally increases with increasing performance quality of the particular cylinder, so that valuable information can be gathered from the read-out of the auxiliary tachometer 18. In a performance test, each cylinder is disabled in turn, so that the condition of each cylinder can be evaluated and appropriate engine adjustments or repairs made.

Since the field effect transistor 36', and also the field effect transistor 26', present a very high impedance to the memory capacitor 35, this capacitor is able to retain stored instantaneous speed signal values practically for entire test phases. As soon as the apparatus is returned to its first mode of operation, the charge at the memory capacitor again follows variations of the speed signal.

The overload protection circuit 42 includes an impedance converter stage 58 connected between the power supply terminals 55 and 56 and also to a point 43' in the energizing circuit of the auxiliary tachometer 18. A Schmitt trigger 60 including transistors 61 and 62 is connected to the stage 58. The Schmitt trigger causes a transistor 64 to interrupt energization of the relay K1 when a high excursion of the speed signal applied at input terminal 19' would cause the instrument 18 to be energized beyond the available indicating range thereof.

Deenergization of the relay K1 results in an opening of the self-holding contact K1B, and in an actuation of the relay contact K1A at the transistor 26' so that the speed signal cancels itself by simultaneous application to the inputs 21 and 22 of the differential amplifier 20. The pointer 31 of the instrument 18 thereupon returns to its initial position set by the control 32.

In the embodiment illustrated in FIG. 2, the protection circuit 42 is supplemented by a further impedance converter 67 stage which causes actuation of the Schmitt trigger 60 and deenergization of the relay K1 to prevent excessive negative excursions of the auxiliary tachometer 18. In this manner the speed signal is applied to both amplifier inputs 21 and 22 when the signal at the amplifier output 19 drops to a value which is below the available indicating range of the instrument 18. Such application of the speed signal causes the pointer of the instrument 18 to return to its initial position set by the control 32.

Those skilled in the art will recognize that the protection circuit 42 performs a very important function in that it not only protects the instrument but, by causing a simultaneous application of the speed signal to the amplifier inputs 21 and 22, also permits the operator to readjust the instrument bias by actuating the control 32 and to verify such readjustment from the reading of the instrument 18 so as to bring the formerly excessive positive or negative excursions within the range of the instrument.

In practice, this is of great assistance to the operator in his conduction and evaluation of his tests.

It will now be recognized that the subject invention provides material advances in the engine testing art. If desired, either or both of the instruments 15 and 18 may be replaced by print-out or other recording or display devices.

To augment the subject disclosure, capacitance and resistance values and component types have been indicated in FIG. 2 by way of example. In this connection, all diodes shown in FIG. 2 may, for instance, be of the type IN4154.

While specific embodiments have been discussed and illustrated various modifications within the scope and spirit of the subject invention will appear or suggest themselves to those skilled in the art.

I claim:

1. Apparatus for indicating variations in a performance parameter of an engine in response to the occurrence of an event affecting the operation of said engine, comprising:
    (a) means for providing a first signal varying in accordance with variations in said performance parameter;
    (b) signal indicating means;
    (c) means connected to said first-signal-providing means and responsive to said first signal for providing a second signal corresponding to an instantaneous value of said first signal at a time prior and proximate to the occurrence of said event; and
    (d) means having a first mode of operation and being actuable to a second mode of operation upon an occurrence of said event, and connected to said means for providing said first signal, to said means for providing said second signal, and to said signal indicating means for supplying in said first mode of operation a third signal to said indicating means, said third signal being substantially constant irrespective of variations of said first signal so that said indicating means are substantially maintained in an initial indicating position in response to said third signal, and for providing in said second mode of operation a fourth signal for said indicating means by comparing variations in said first signal during occurrence of said event with said second signal, and for supplying said fourth signal to said indicating means so as to cause said indicating means to indicate variations in said performance parameter during the occurrence of said event.

2. Apparatus as claimed in claim 1, including means for sensing said fourth signal and for actuating said means having said first and second modes of operation to said first mode of operation when said fourth signal reaches a value substantially outside a predetermined indicating range of said signal indicating means.

3. Apparatus as claimed in claim 1, including means for sensing said fourth signal and for actuating said means having said first and second modes of operation to said first mode of operation when said fourth signal drops to a value below a predetermined indicating range of said signal indicating means, as well as when said fourth signal reaches a value above a predetermined indicating range of said indicating means.

4. Apparatus as claimed in claim 1, wherein said means having said first and second modes of operation include means for adjusting said signal indicating means to a desired indicating position by adjusting the value of said third signal.

5. Apparatus as claimed in claim 1, including second signal indicating means connected to said means providing said first signal for indicating variations in said performance parameter during both said first and second modes of operation of said means having said first and second modes of operation.

6. Apparatus for indicating variations in a performance parameter of an engine in response to the occurrence of an event affecting the operation of said engine, comprising:
    (a) means having a first input and a second input and providing an output signal by comparing a signal at said first input with a signal at said second input;
    (b) signal indicating means connected to said comparing means for indicating said output signal;
    (c) means for providing a first signal varying in accordance with variations in said performance parameter;
    (d) means connected to said first-signal-providing means and responsive to said first signal for providing a second signal corresponding to an instantaneous value of said first signal at a time prior and proximate to the occurrence of said event; and
    (e) means having a first mode of operation and being actuable to a second mode of operation upon an occurrence of said event, and connected to said means for providing said first signal, to said means for providing said second signal, and to said signal comparing means for supplying in said first mode of operation said first signal to said first input and to said second input of said comparing means to cause said indicating means to be maintained substantially in an initial indicating position irrespective of variations in said performance parameter, and for supplying in said second mode of operation said first signal to said first input of said comparing means and said second signal to said second input of said comparing means to cause said indicating means to indicate variations in said performance parameter during the occurrence of said event.

7. Apparatus as claimed in claim 6, wherein said means for providing said second signal include signal storage means for providing said second signal by storing a signal corresponding to said substantially instantaneous value of said first signal and for supplying said stored signal to said second input of said comparing means during said second mode of operation.

8. Apparatus as claimed in claim 6, wherein said means having said first and second modes of operation include means for adjusting said signal indicating means to a desired indicating position by supplying an adjustable bias signal to one of said first and second inputs of said comparing means.

9. Apparatus as claimed in claim 6, including means for sensing said output signal of said comparing means and for actauting said means having said first and second modes of operation to said first mode of operation when said output signal reaches a value substantially outside a predetermined indicating range of said signal indicating means.

10. Apparatus as claimed in claim 6, including means for sensing said output signal of said comparing means and for actuating said means having said first and second modes of operation to said first mode of operation when said output signal drops to a value below a predetermined indicating range of said indicating means, as well as when said output signal reaches a value above a predetermined indicating range of said indicating means.

11. Apparatus as claimed in claim 6, wherein performance parameter is engine speed and said signal providing means provide a first signal varying in accordance with variations in the speed of said engine.

12. Apparatus as claimed in claim 11, wherein said engine has a plurality of internal combustion cylinders, and said event is a selective disablement of one of said cylinders.

13. Apparatus as claimed in claim 11, wherein said engine is an internal combustion engine having an adjustable carburetor, and said event is an adjustment of said carburetor.

14. Apparatus as claimed in claim 6, including second signal indicating means connected to said means providing said first signal for indicating variations in said performance parameter during both said first and second modes of operation of said means having said first and second modes of operation.

References Cited

UNITED STATES PATENTS 2,809,344 10/1957 Mayer et al.
2,866,016 12/1958 Weiss _____ 330—69 X RICHARD C. QUEISSER, Primary Examiner J. W. MYRACLE, Assistant Examiner U.S. Cl. X.R.

330—69